United States Patent

Kerr

[11] 3,895,700
[45] July 22, 1975

[54] WORM/WORM-WHEEL OVERRUNNING CLUTCH

[75] Inventor: John Hugh Kerr, Kitchener, Canada

[73] Assignee: Ker-Train Systems N.V., Curacao, Netherlands Antilles

[22] Filed: Jan. 2, 1974

[21] Appl. No.: 429,610

[30] Foreign Application Priority Data
Jan. 9, 1973 Canada.................................. 160906

[52] U.S. Cl................................. 192/41 R; 74/425
[51] Int. Cl............................................. F16d 41/00
[58] Field of Search...................... 192/41 R; 74/425

[56] References Cited
UNITED STATES PATENTS

| | | | |
|---|---|---|---|
| 1,470,565 | 10/1923 | Hall.................................. | 192/41 R |
| 1,771,228 | 7/1930 | Morici............................... | 192/41 R |
| 1,946,877 | 2/1934 | Parker............................... | 192/41 R |
| 2,407,099 | 9/1946 | Richards........................... | 192/41 R |

OTHER PUBLICATIONS
Product Engineering, Nov. 7, 1960, p. 65.

*Primary Examiner*—Allan D. Herrmann

[57] ABSTRACT

Known cam and roller-ramp overrunning clutches depend on frictional forces to effect a kinematic lock between the driven and driving members and they are dynamically limited to a specific engagement-disengagement cycle. In the present invention the transmission of torque between the driving and driven members is accomplished by a worm/worm-wheel combination such that dependence on frictional forces is eliminated. The congruent surfaces of the lands on the worm and the teeth of the worm-wheel are sloped so that there is normal free-wheeling of the worm upon rotation of the worm-wheel in one direction but there is locking action upon rotation of the worm-wheel in the other direction. The lead angle of the worm is such that the worm would normally be free-wheeling in either direction of rotation. Because engagement and disengagement is positively programmed the application of the locking elements is not limited kinematically to any specific cycle.

6 Claims, 15 Drawing Figures

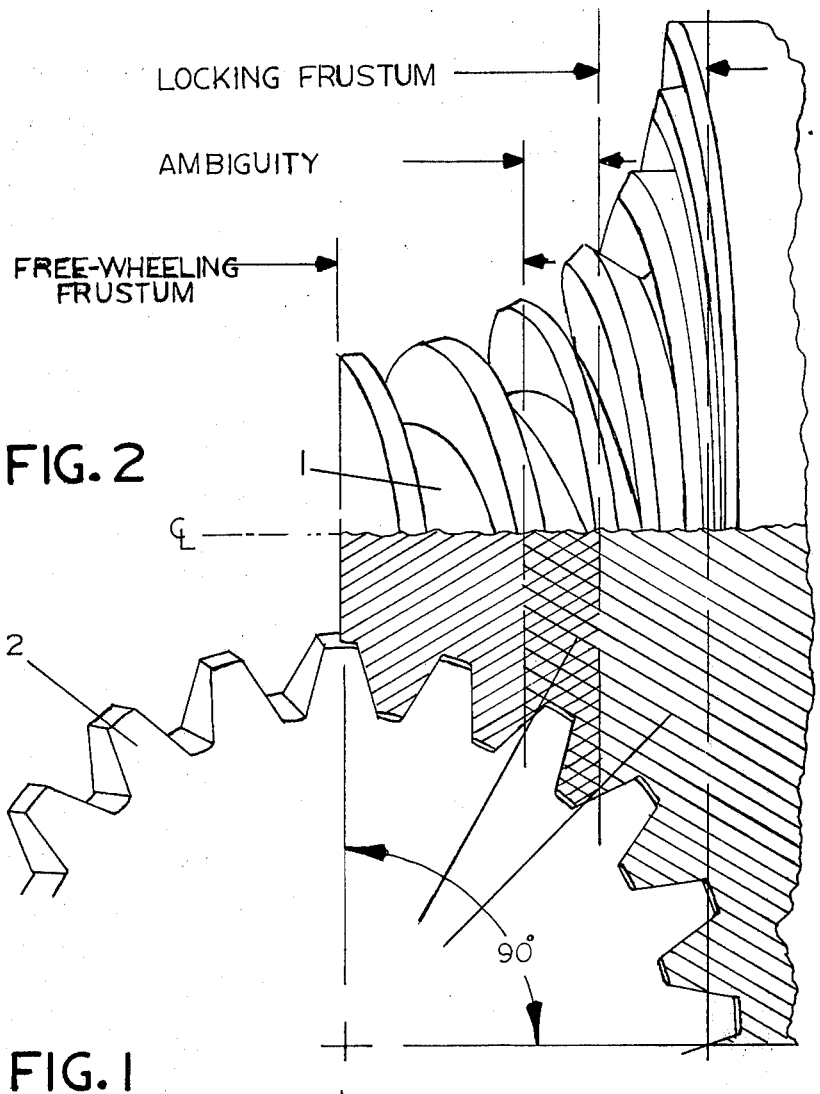
FIG. 2
FIG. 1
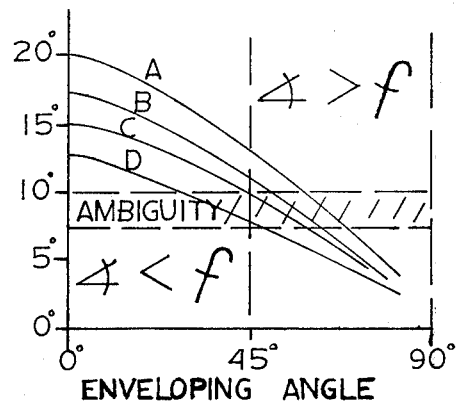

WORM/WORM-WHEEL OVERRUNNING CLUTCH

This invention is directed to overrunning cam and roller-ramp clutches. The specific technology of this invention resides in the embodiments of worm and worm-wheel gear elements, such that they perform effectively the same kinematic task as the cams or the roller-ramp combination of the overrunning clutches as referenced in the following United States Patents: U.S. Pat. Nos. 3,320,006, 3,320,007, 3,184,020, 3,194,368.

The referenced overrunning clutches are so designed that torque can be transmitted between the inner race and the outer race of the clutches in one direction of rotation, through the jamming action of the cams or rollers which depends on frictional forces between the cams or rollers and the clutch races for their effectiveness, but which overrun (freewheel) when the driving member has a relatively opposite rotation to that of the driven member. In all such overrunning clutches the jamming action requires a relative movement between the driving and driven elements to produce the frictional lock, with the amount of relative movement between the driven and driver elements of the clutch being subject to the magnitude of the torque being transmitted through the assembly. Further, because of the inertia forces associated with the engagement action, kinematic hysterisis (unprogrammed response of the cams or rollers to the jamming action) limits application of this type of overrunning clutch to those requiring less than three hundred engagements per minute.

By the kinematic substitution of worm and worm-wheel gear elements of specific embodiments for the cams or roller-ramp combination of such overrunning clutches, a clutching unit can be constructed such that the kinematic lock between the driver and driven elements is of a positive nature that does not depend on frictional forces for their effectiveness; that all but eliminates the requirement for a relative motion between the two members for positive engagement; and that eliminates kinematic hysterisis, thereby not limiting their application to any specific number of engagements per minute.

It is an object of this invention to disclose the specific embodiments of the worm and worm-wheel gear elements that make them adaptable to overrunning clutches.

A further object of this invention is to qualify specific kinematic lay-outs of worm/worm wheel overrunning clutches of conventional application where the driving member will not overrun the driven member.

Another object of this invention is to qualify specific kinematic lay-outs of worm/worm-wheel overrunning clutches that may be externally activated such that the driving member will either drive or overrun the driven member, with the driven member capable of overrunning the driving member as in conventional application.

The above and other objects of the invention are met with the present application which comprises a pair of engagable worm and worm-wheel gear elements characterized in that the congruent surfaces of the land(s) on the worm and the teeth on the worm-wheel are sloped such that relative rotation of the worm-wheel in one direction with respect to the worm, will cause the worm to rotate freely about its axis, while a relatively opposite rotation of the worm-wheel, in respect to the worm, is prevented because of the accentuated slopes of the congruent surfaces of the land(s) on the worm and the teeth on the worm-wheel, which effectively changes the normal characteristic of the worm from that of a "free-wheeling worm" in both directions of rotation of the worm-wheel, to that of a "locking-worm" when relative rotation of the worm-wheel is attempted in at least one of the directions.

Other features and characteristics of this invention will be apparent from the following detailed description and explanation taken in conjunction with the accompanying drawings, in which:

FIG. 1 shows the relationship between the lead angle of the land(s) of an enveloping worm and the amount of enveloping.

FIG. 2 shows the frustums of different dynamic characteristics of an enveloping worm.

The constant lead angle of the land(s), on the worm of a common pair of worm and worm-wheel gears, is a function of the number of land starts on the worm and the ratio between the worm and the worm-wheel. The change in the lead angle of the land(s) on an enveloping worm, from that maximum value at a point on the land(s) described by a line passing through the center of the worm-wheel and perpendicular to the axis of the worm, is a function of the amount of enveloping of the worm. Worms are locking, in respect to the worm-wheel being the driving element, when the tangent value of the lead angle of the land(s) is less than the coefficient of friction between the two elements, and free-rotating when the land(s) have lead angles with tangent values greater than the coefficient of friction between the two elements. It follows, therfore, that enveloping worms have frustums of relatively different dynamic properties with respect to their tendency to lock, with this tendency increasing with the amount of enveloping of the worm around the worm-wheel.

FIG. 1 shows this characteristic change in the lead angles of the frustums of four representative enveloping worms with enveloping related to a 90° sector of the worm-wheel as measured from a line perpendicular to the axis of the worms and passing through the center of the worm-wheel. With the coefficient of friction between the gear elements falling within the zone indicated by the lead angle of 7.5° and 10°, the frustums of the worms with lead angles above this zone, as shown on the graphs of FIG. 1, are free-wheeling, and the frustums of the worms with lead angles below this zone are locking. FIG. 2 shows a Sectional view through an enveloping worm and worm-wheel, with item 1 being the worm and item 2 the worm-wheel, with the characteristic change in the lead angle of the lands of the worm as shown in graph C of FIG. 1. The single enveloping worm is sectioned as shown to indicate the frustums of different dynamic characteristics. It is to be noted that if contact between the two gear elements is limited to the specific frustums shown, then the worm can be made to be either a locking or a free-wheeling worm.

Figure 3:
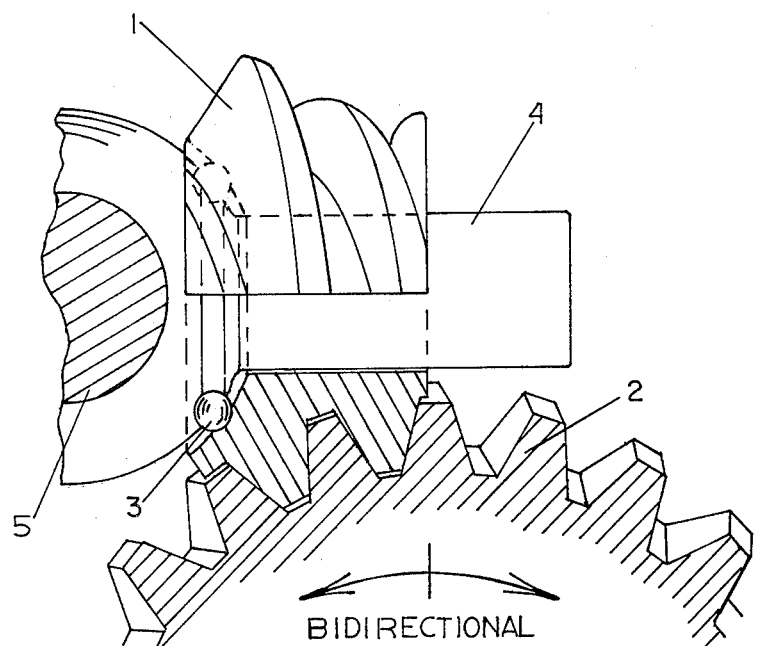
FIG. 3 shows a bidirectional rotatable worm-wheel and enveloping worm.
Figure 4:
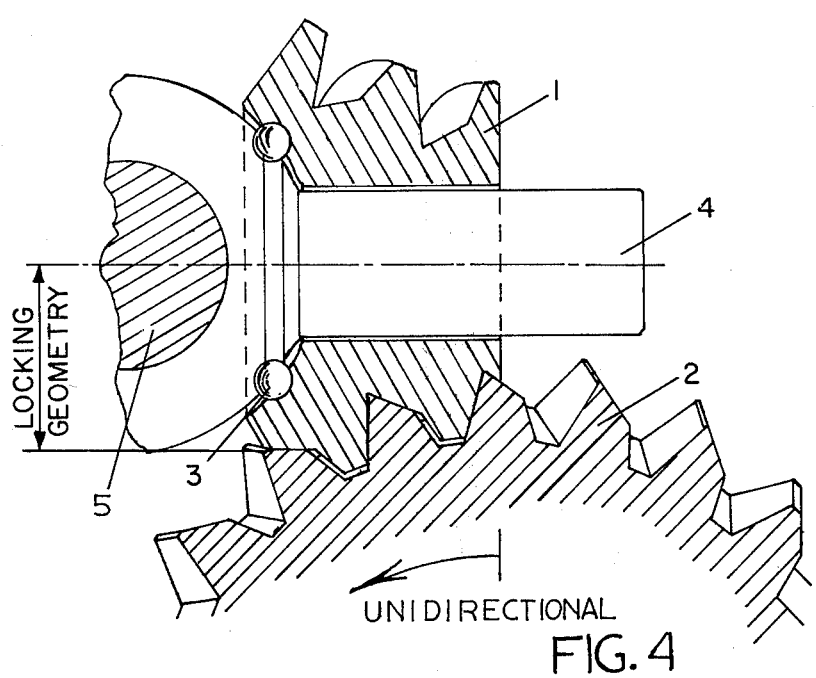
FIG. 4 shows a unidirectional rotatable worm-wheel and enveloping worm.

A second factor between a pair of worm and worm-wheel gear elements, and more specifically enveloping worm and worm-wheel gear elements, that contributes to or indeed can be the predominant embodiment that makes this technology applicable to overrunning clutches, is the slope of the respective congruent teeth and land(s) surfaces of the two gear elements during the free-wheeling and locking modes in the operation of the clutches. The greater the slope (the slope being effectively the pressure angle of the congruent surfaces as measured on the teeth of the worm wheel), the greater is the tendency of the worm-wheel to lock against the worm. This characteristic is accentuated in enveloping worms as shown in FIGS. 3 and 4, with item 1 being the worms, item 2 being the worm-wheels, item 3 the free-wheeling thrust bearings, item 4 the worm mandrel, and item 5 the worm mandrel retaining pin. The worm-wheel of FIG. 3, is capable of bidirectional rotation since the worm frustum has characteristics similar to the free-wheeling frustum of FIG. 2, for both pairs of congruent surfaces. Whereas, the worm-wheel of FIG. 4, is capable of only unidirectional rotation since one pair of congruent surfaces has characteristics similar to the free-wheeling frustums of FIG. 2, but the second pair of congruent surfaces have more pronounced sloping surfaces that form a geometric lock with the axis of the worm. Contact between the surfaces of the two gear elements when in the locked mode is assumed to be only on the more pronounced sloping surfaces of the congruent elements.

Figure 5:
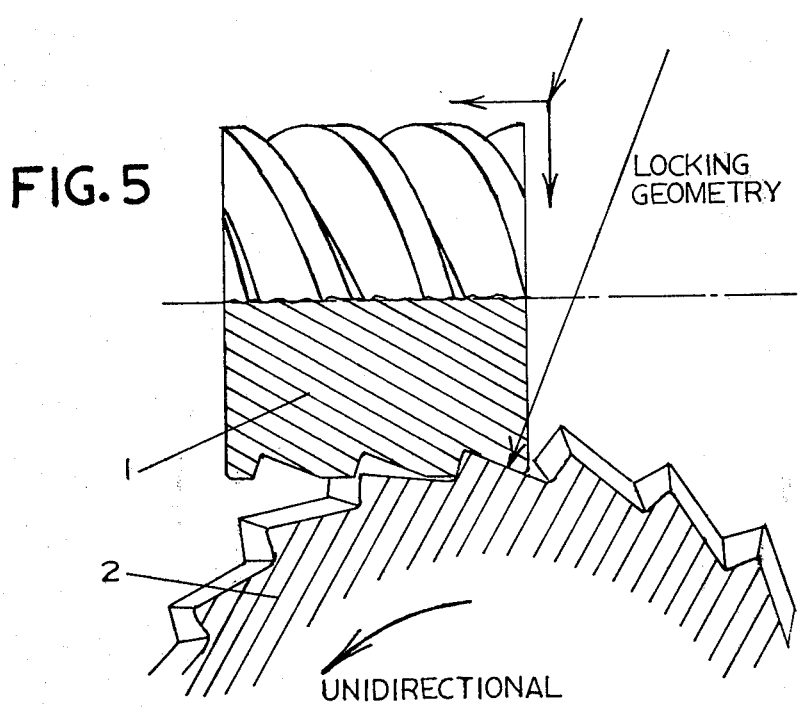
FIG. 5 shows a unidirectional rotatable worm-wheel and common worm.

Further, since congruent contact between the land(s) of enveloping worms and the teeth of the worm-wheel tends to vary from that of full line contact at a point on the land(s) described by a line passing through the center of the worm-wheel and perpendicular to the axis of the worm, to full tooth contact at the outer extremity of the enveloping worm frustum when the teeth on the worm-wheel are generated to the outer profile of the worm land(s), the more critical locking surfaces between the two gear elements are those at the extremity of the worm. Similarly, the degree to which the characteristic of slope effects the locking tendency of enveloping worms is accentuated at the extremity of the worm. Accordingly, the tendency of an enveloping worm towards locking characteristics is a function of the coefficient of friction between the two elements, the number of land(s) starts on the worm, the ratio between the two gear elements, the basic slope of the congruent surfaces of the two gear elements, and the amount of enveloping of the worm around the worm-wheel. From a simple analysis of FIGS. 3 and 4, it can be seen that the basic slope of congruent surfaces when correlated to the amount of enveloping of the worm, is the decisive embodiments that exemplifies the adaptation of this technology to overrunning clutches when enveloping worms are used as the locking elements. From FIG. 5, which shows a common worm and worm-wheel gear element, item 1 being the worm, and item 2 being the worm-wheel, it can be seen that the basic slope of the congruent surfaces is the sole decisive embodiment that exemplifys their adaptation. Although there are certain advantages in the use of either type of worm, the most significant advantage of the enveloping worm is that the congruent locking surfaces can be so sloped that they effectively become parallel to the axis of the worm and effectively form a geometric lock since contact between the sloping surfaces of the land(s) is dominant towards the outer extremity of the worm. This is not the case with the common worm as shown in FIG. 5.

Figure 6:
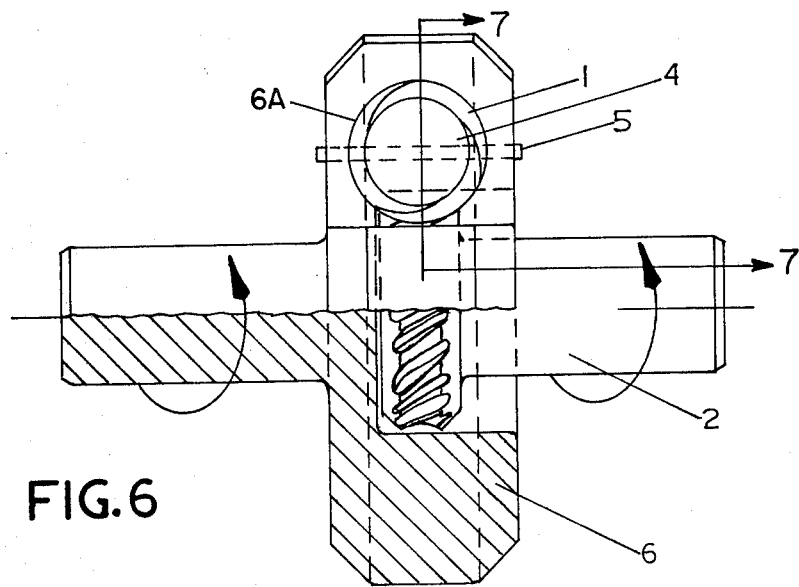
FIGS. 6 and 7 show a conventional application overrunning clutch.
Figure 7:
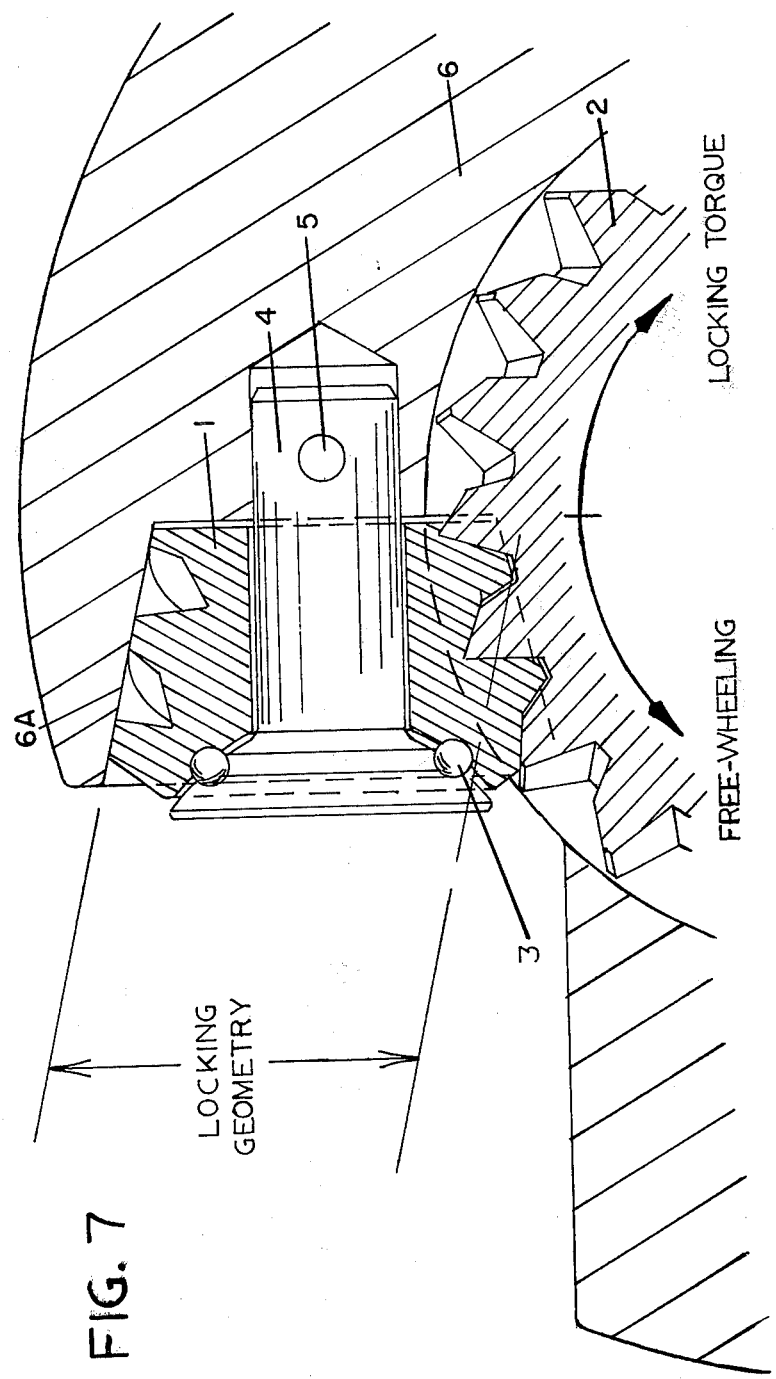

FIGS. 6 and 7, show the general lay-out of an enveloping worm/worm-wheel overrunning clutch of conventional application using an enveloping worm with a conical addendum surface that abuts against the outermost surface of the cavity in the body of the clutch it occupies when in the locked mode, forming a geometric lock such that the driver element 2, will not overrun the driven element 6, when rotation of the two elements are as shown; item 1 being the conical worm, item 2 being the worm-wheel and driver shaft, item 3 being the free-wheeling thrust bearings, item 4 being the worm mandrel and cap assembly, item 6 being the main body of the overrunning clutch and driven shaft with conical cavity 6A, and item 5 being the worm mandrel retaining pin. FIG. 7 is a sectional view through the overrunning clutch of FIG. 6 as shown by section 7—7.

When the driver shaft and worm-wheel item 2 of FIGS. 6 and 7, has rotation relative to the driven shaft and main body of the overrunning clutch item 6, as indicated by the free-wheeling arrow of FIG. 7, the congruent free-wheeling surfaces of the two gear elements are in contact, with the result that the worm is free to rotate against the thrust bearing item 3, in the cavity 6A of the main body item 6. Accordingly, the overrunning clutch is in the free-wheeling mode, and the main body and driven shaft overruns the driver shaft and worm-wheel item 2.

When the driver shaft and worm-wheel item 2 of FIGS. 6 and 7, attempts to rotate relative to the driven shaft and main body of the overrunning clutch item 6, as indicated by the locking arrow of FIG. 7, the congruent locking surfaces of the two gear elements are in contact, with the result that the worm is forced against the upper surface of the cavity 6A of the main body 6, effectively forming a geometric lock between the congruent surfaces of the gear elements and the outer surface of the cavity of the main body of the overrunning clutch. Accordingly, the overrunning clutch is in the locked mode and torque, therefore, can be transferred between the driver and driven members of the clutch.

Figure 8:
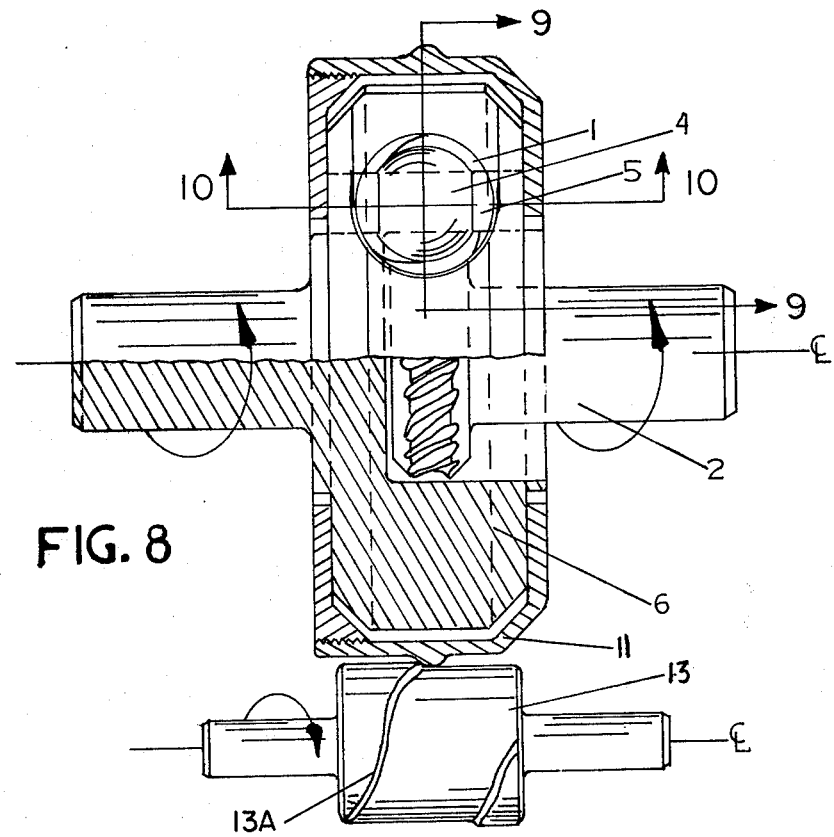
FIGS. 8 to 10 show an externally activated overrunning clutch.
Figure 10:
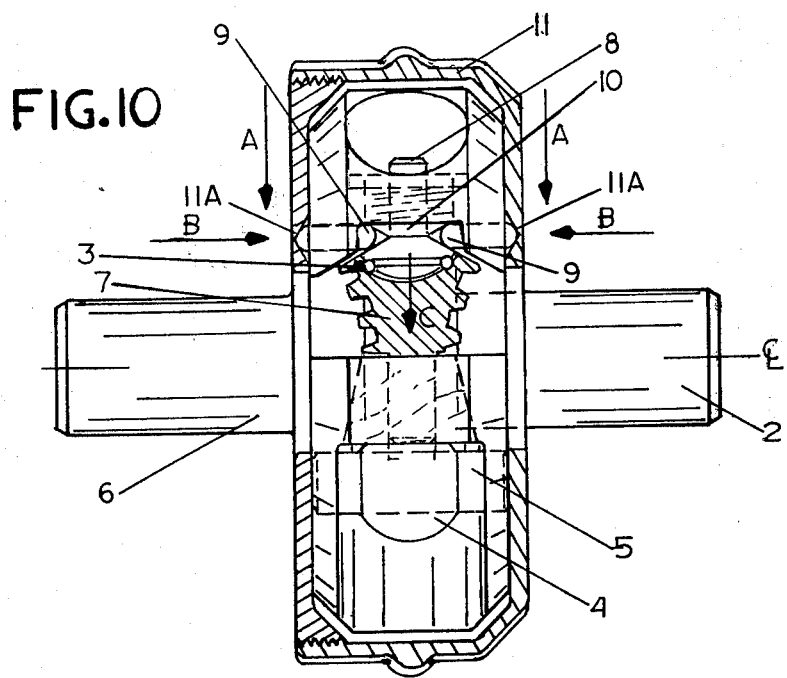
Figure 9:
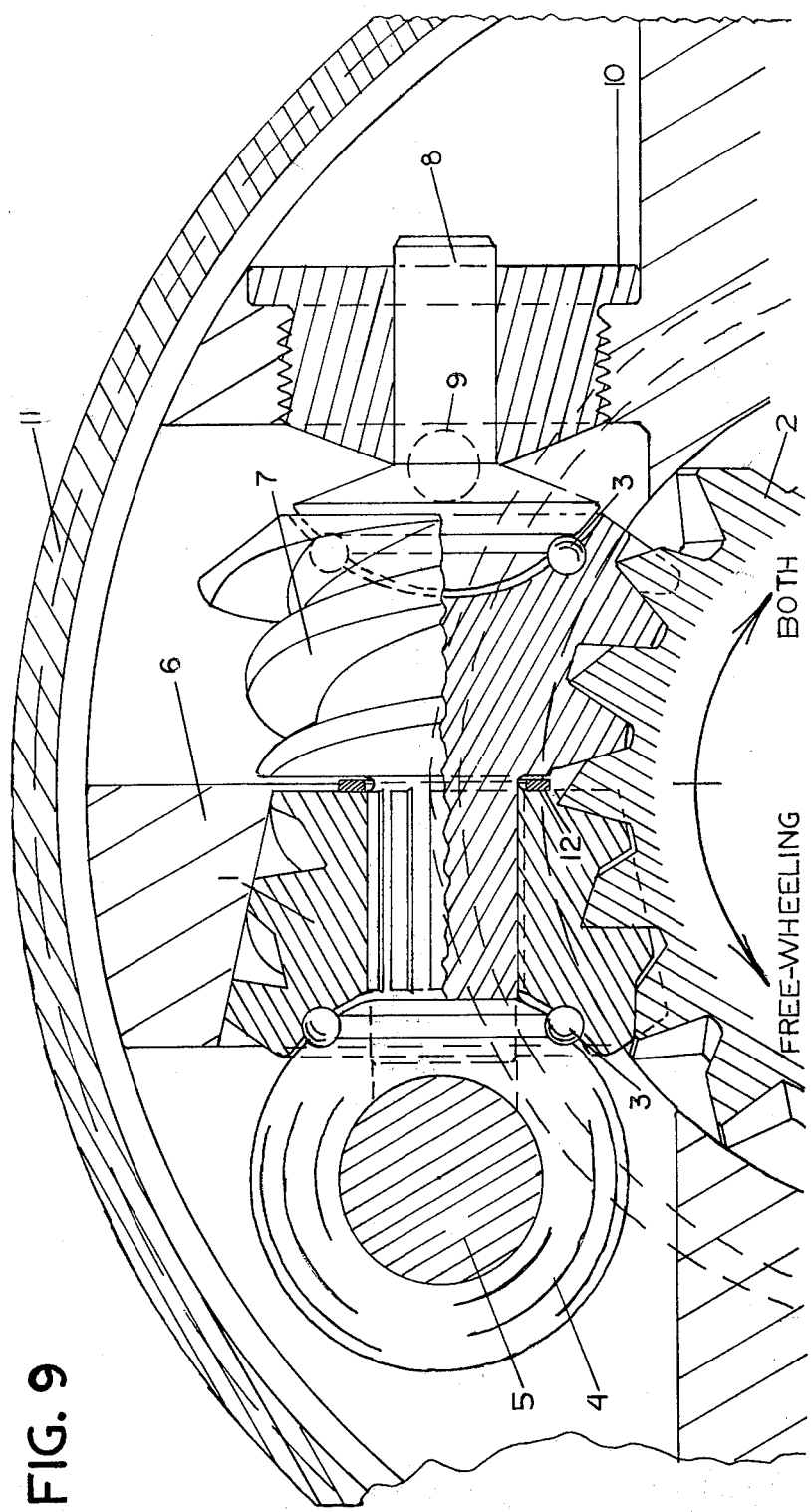

FIGS. 8 and 9, show the general lay-out of a worm-/worm-wheel overrunning clutch that may be externally activated such that the driver element can be made to drive or overrun the driven element, with the driven element capable of overrunning the driver element as in the previous application when rotation of the driver element item 2, and the driven element item 6 are as shown; item 1 being similar to the conventional worm of FIGS. 6 and 7, with the exception that the center hole is splined and free to move axially on the extended shaft of a second enveloping worm item 7, with free-wheeling characteristics in both directions of rotation of the worm-wheel as shown in FIG. 2, item 2 being the worm-wheel and driver shaft, item 3 thrust bearings of worms items 1 and 7, item 4 the thrust bearing race of worm 1, item 6 being the main body of the overrunning clutch and driven shaft, item 8 being the thrust bearing race of worm 7, incorporating a chamfered face for the engagement pawls 9 (FIG. 5), item 5 being the thrust bearing race retaining pin of the worm 1, item 10 being an insert with chamfered face, item 12 spacer washer, item 9 being the engagement pawls, 11 being the engagement ring, and 13 being the engagement cam with lobes 13A. FIG. 10 is a sectional view through the overrunning clutch of FIG. 8 as shown by section 10—10, and shows the action of the conical cavities of the engagement ring item 11A, against the outer ends of the, and engagement pawls item 9, when with their relative motion is as shown respectively, by the arrows A and B.

When the driver shaft and worm-wheel item 2 of FIGS. 8 and 9, has rotation relative to the driven shaft and main body of the overrunning clutch item 6, as indicated by the free-wheeling arrow of FIG. 9, the congruent free-wheeling surfaces of the worm item 1, and the second worm item 7 with free-wheeling characteristics in both directions, are in contact with the worm-wheel such that both worms are free to rotate in their respective cavities in the main body of the clutch with the result that the clutch is in the conventional free-wheeling mode and the driven shaft is free to overrun the driver shaft and worm-wheel, similar to the overrunning mode of the overrunning clutch of FIGS. 6 and 7.

When the driver shaft and worm-wheel item 2 of FIGS. 8 and 9, attempts to rotate relative to the driven shaft and main body of the overrunning clutch item 6, as indicated by the locking arrow of FIG. 9, the congruent locking surfaces of the locking worm item 1 are engaged with the locking slopes of the worm-wheel, with the congruent free-wheeling surfaces of the second worm item 7 such that the second worm is not in contact with the worm-wheel as caused by the spacer washer item 12. Accordingly the overrunning clutch is in the locked mode similar to the locked mode of the overrunning clutch of FIGS. 6 and 7. However, at anytime during the conventional locked mode of the overrunning clutch of FIGS. 8 and 9, displacement of the engagement ring item 11, by the lobes 13A of the engagement cam 13, so that its center of rotation is displaced outwards from the engagement cam which rotates as shown, will force the engagement pawls item 9, inwardly because of the interaction between the conical cavities 11A and the outer ends of the pawls, thereby forcing the thrust mandrel item 8 towards the worm item 1, carrying with it the second worm item 7 as caused by the action of the pawls on the respective chamfered faces of items 8 and 10, with the result that the free-wheeling congruent surfaces between the second worm item 7, and the worm-wheel are engaged, and the locking congruent surfaces between the worm item 1, and the worm-wheel are disengaged. This action results in the worm-wheel and driver shaft item 2, being free to overrun the main body and driven shaft of the clutch, with both worms, items 1 and 7, free to rotate in their respective cavities of the main body, with the second worm item 7, driving worm item 1, through their congruent compounding splines. FIG. 10 shows the action of the pawls item 9, which force movement of the thrust mandrel item 8, such that two worms come together with the subsequent transfer of kinetic forces acting on the conventional locking worm item 1 to the free-wheeling second worm item 7, as the center of rotation of the engagement ring item 11, is displaced from its normal center of rotation with the coaxial mounted driven and driver shafts items 2 and 6.

Figure 11:
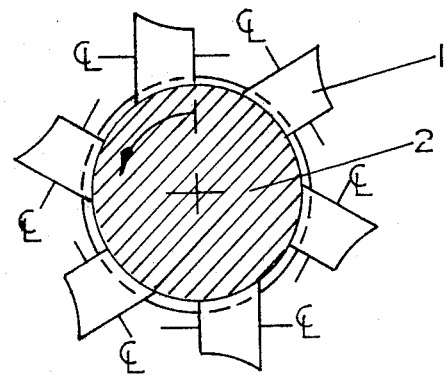
FIGS. 11 to 13 show combinations of the worm/worm-wheel gear elements of overrunning clutches.
Figure 12:
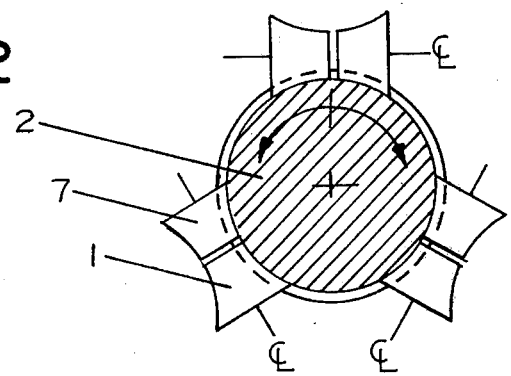
Figure 13:
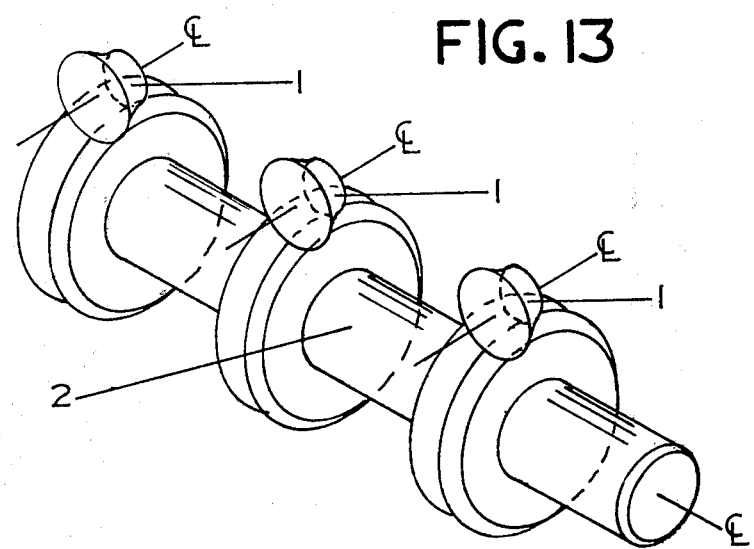

In FIGS. 6 and 7; FIGS. 8, 9 and 10; only one set of worms and associated elements are shown since additional worms are redundant in respect to the mechanical principle of the technology of worm/worm-wheel overrunning clutches. FIGS. 11, 12 and 13, depict the lay-outs of the pitch frustums of worm(s) and worm-wheel(s) of multiple unit configuration and illustrate the scope to which this technology can be applied to overrunning clutches.

In respect to the normal application of the term "locking-worm", i.e., when the tangent value of the effective lead angle of the land(s) of the worm is less than the coefficient of friction between the two gear elements, the required increase in the slope of the teeth and land(s) of the gear elements and the degree of enveloping required to make a normally free-wheeling worm capable of locking is dependent on the initial characteristics of the two elements and cannot be quantified without reference to the original configuration of the worm and worm-wheel. However, the term "locking worm" as used to connote that the worm forms a geometric lock between the worm-wheel and the outer surface of the cavity that it occupys in the body of the overrunning clutches as depicted in FIGS. 6 and 7, and FIGS. 8, 9 and 10, does not depend on the initial characteristics of the teeth and land(s) on the two gear elements and, therefore, can be quantified without reference to the original configuration of the free-wheeling worm and worm-wheel.

Figure 14:
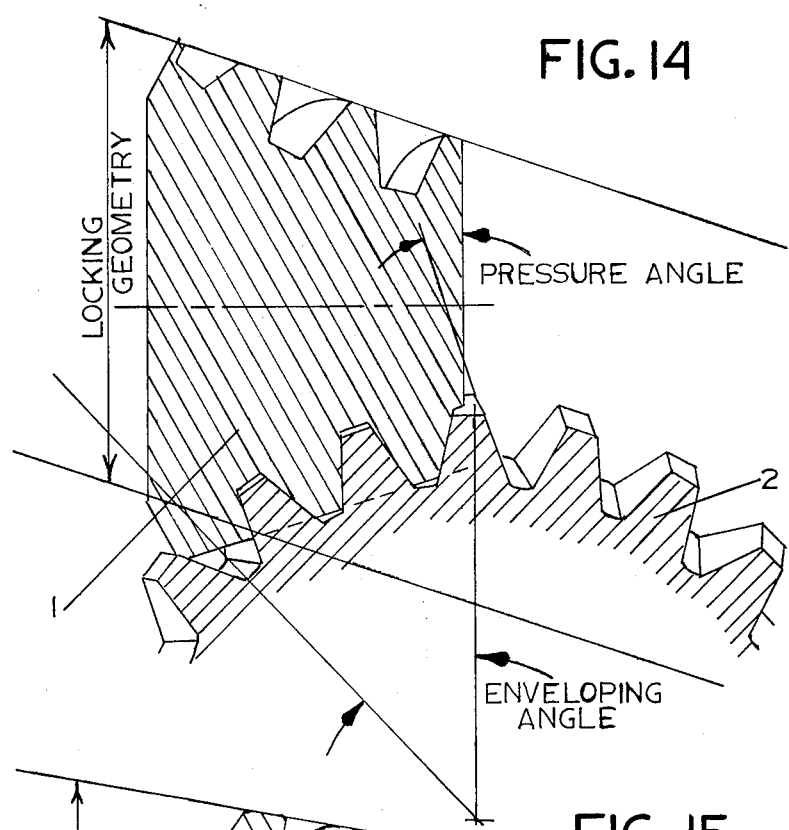
FIGS. 14 and 15 show the relationship between pressure angle and enveloping angle.
Figure 15:
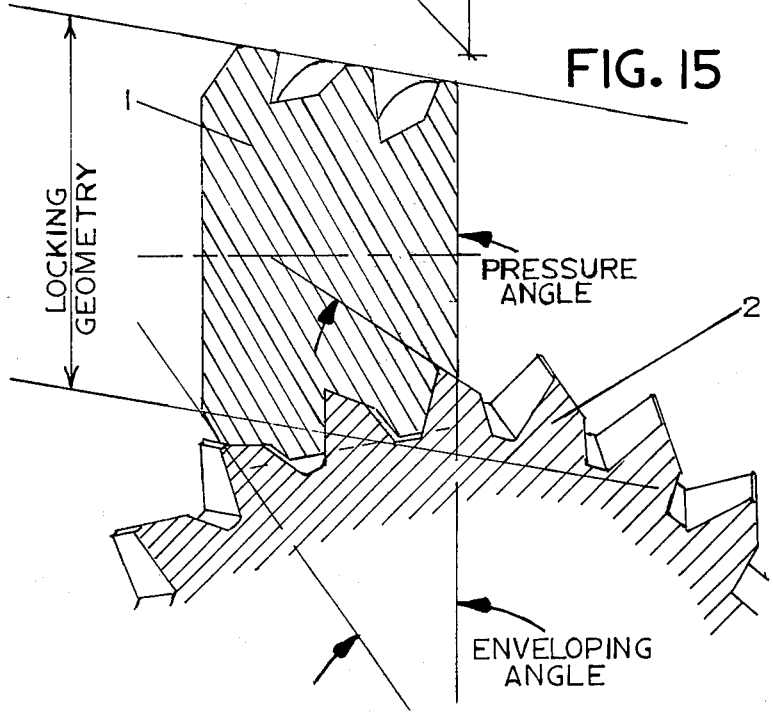

FIGS. 14 and 15, show the correlation of slope and degree of enveloping that embraces the embodiment of this criteria to the technology for worm/worm-wheel overrunning clutches with the slope interpreted as the pressure angle of the teeth on the worm-wheel in accordance with standard gear technology, and the degree of enveloping measured as the subtended angle between the line perpendicular to the axis of the worm and passing through the center of the worm-wheel, to a radii of the worm-wheel that passes through the outermost contact point of the pitch circle profile of the worm-wheel and the pitch frustum of the enveloping worm, with the conical addendum of the worm defined by a line from the same point and passing through the normal minimum addendum of the worm on the line perpendicular to its axis and passing through the center of the worm-wheel. This is not to imply that the technology of enveloping worm/worm-wheel overrunning clutches does not embrace both the above definitions of "locking-worms" but rather is presented to establish clearly the full scope of the technology and to clearly separate the positive locking characteristics of the enveloping worm elements from common worm elements which depended on frictional forces for their effectiveness irrespective of the abnormality in the slope of the congruent locking surfaces.

I claim:

1. A worm and worm-wheel gear assembly, the worm at least partially enveloping the worm-wheel in at least one direction over a subtended angle, the lands of the worm having at least two surfaces each of which is congruent to a corresponding surface on the teeth of the worm-wheel to thereby form at least two pairs of congruent surfaces, wherein the congruent surfaces of one of said pairs are sloped so as to be relatively perpendicular to the axis of the worm throughout the subtended angle of envelopment and the congruent surfaces of the other of said pairs are sloped so as to be relatively parallel to the axis of the worm within said subtended angle, whereby rotation of the worm results from rotation of the worm-wheel when the congruent surfaces of said first pair are engaged and locking of the worm relative to the worm-wheel results when the congruent surfaces of said second pair are engaged, the locking characteristics of the assembly being independent of the coefficient of friction between said pairs of congruent surfaces within said subtended angle.

2. An overrunning clutch of conventional application where the driving member will not overrun the driven member and where the driven member is capable of overrunning the driving member comprising a cylindrical main body connected to the driven member and a worm-wheel connected to the driving member, at least one rotatable enveloping worm free to rotate on a mandrel bearingly mounted in said main body, said mandrel having its axis perpendicular to and adjacent to the axis of the main body, said worm-wheel being concentrically mounted with the main body so that the worm and worm wheel meshingly engage, the worm enveloping the worm-wheel in at least one direction over a subtended angle, the lands of the worm having at least two surfaces each of which is congruent to a corresponding surface on the teeth of the worm-wheel to thereby form at least two pairs of congruent surfaces, the congruent surfaces of one of said pairs being sloped so as to be generally perpendicular to the mandrel axis throughout the subtended angle of envelopment and the congruent surfaces of the other of said pairs being sloped so as to be generally parallel to the mandrel axis within said subtended angle whereby free-wheeling rotation of the worm upon rotation of the worm-wheel occurs when the congruent surfaces of said first pair are engaged and locking of the worm relative to the worm-wheel occurs when the congruent surfaces of said second pair are engaged, with the driven and driving members subject to the law of kinematic reversal.

3. The overrunning clutch of claim 2 wherein said mandrel is mounted in a generally conically-shaped cavity in said main body and said worm has its addendum frustum also generally conically-shaped so that the congruent surfaces of said second pair are generally parallel to an outer surface portion of said cavity.

4. The overrunning clutch of claim 3 wherein said cavity has enclosing end faces which prevent axial movement of said worm.

5. The overrunning clutch of claim 3 wherein a plurality of said worms are mounted so as to envelop portions of said worm-wheel, each mandrel being cantilevered in its appropriate cavity adjacent the smaller end of the worm and carrying a thrust bearing adjacent the larger end of the worm to limit axial movement of the worm.

6. An overrunning clutch that may be externally activated such that the driving member is capable of overrunning the driven member, but that otherwise acts as an overrunning clutch of conventional application comprising: a plurality of relatively rotatable pairs of worms, each worm at least partially enveloping a toothed worm-wheel attached to said driving member; with one worm of each pair having the congruent surfaces of its lands and the teeth of said worm-wheel sloped to permit free-wheeling rotation of the worm upon rotation of the worm-wheel in one direction and to prevent rotation of the worm upon rotation of the worm-wheel in the opposite direction, and so splined and mounted to move axially on an extended splined shaft of the second worm of each pair which has free-wheeling characteristics in both directions of rotation relative to said worm-wheel; with each pair of worms mounted on suitable bearings in a main body of the overrunning clutch to which is attached said driven member; an engagement ring externally mounted on said clutch so as to which normally rotate on the same center as the driving and driven members of the assembly; a movable engagement mandrel mounting the bearings of the second worm of each pair; a plurality of engagement pawls connecting the engagement ring with each engagement mandrel; and means for camming the engagement ring to rotate away from the center to thereby force the engagement pawls against the engagement mandrels with subsequent movement of the second worm towards the first worm such that the kinematic loads being transferred through the first worm between the driving and driven members of the assembly are transferred to the second worm with the result that the driving member can overrun the driven member, with the total assembly subject to the law of kinematic reversal.

* * * * *